UNITED STATES PATENT OFFICE.

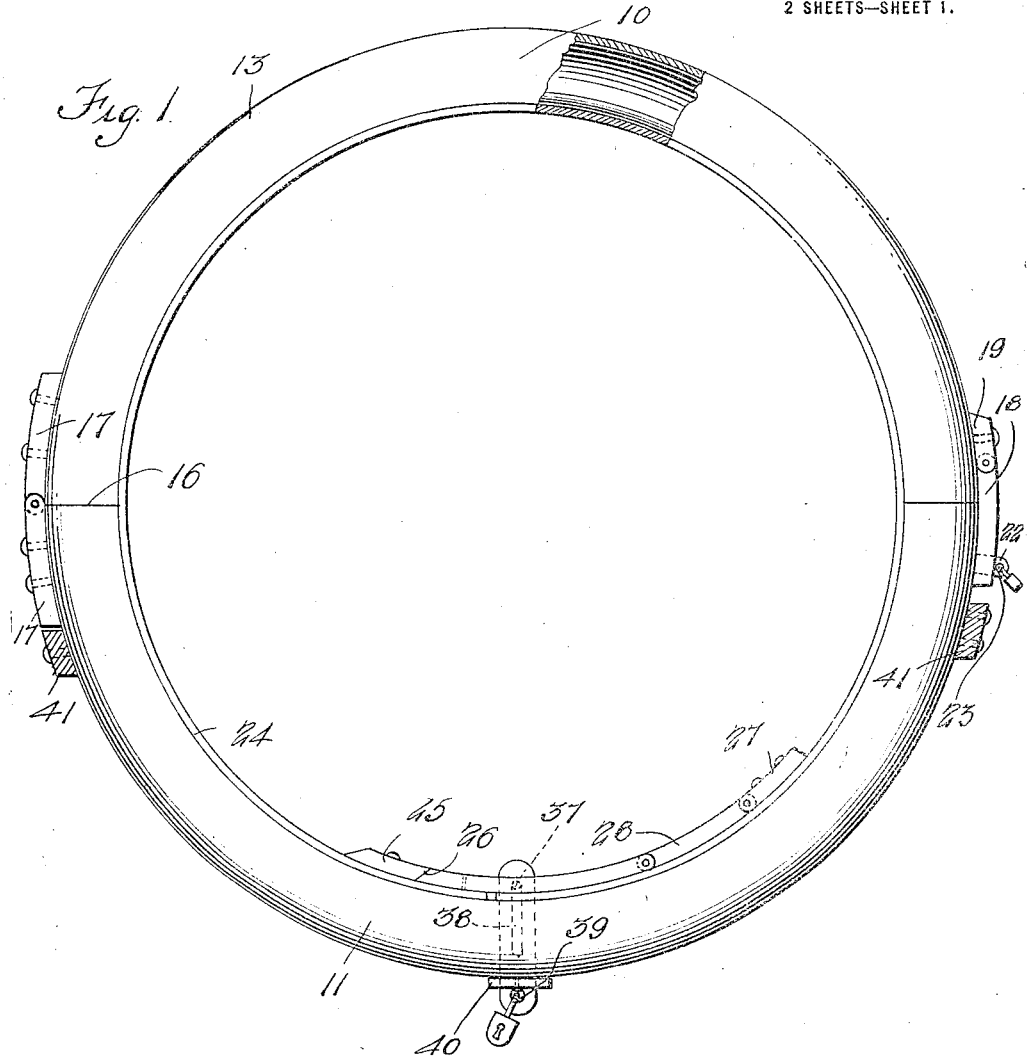

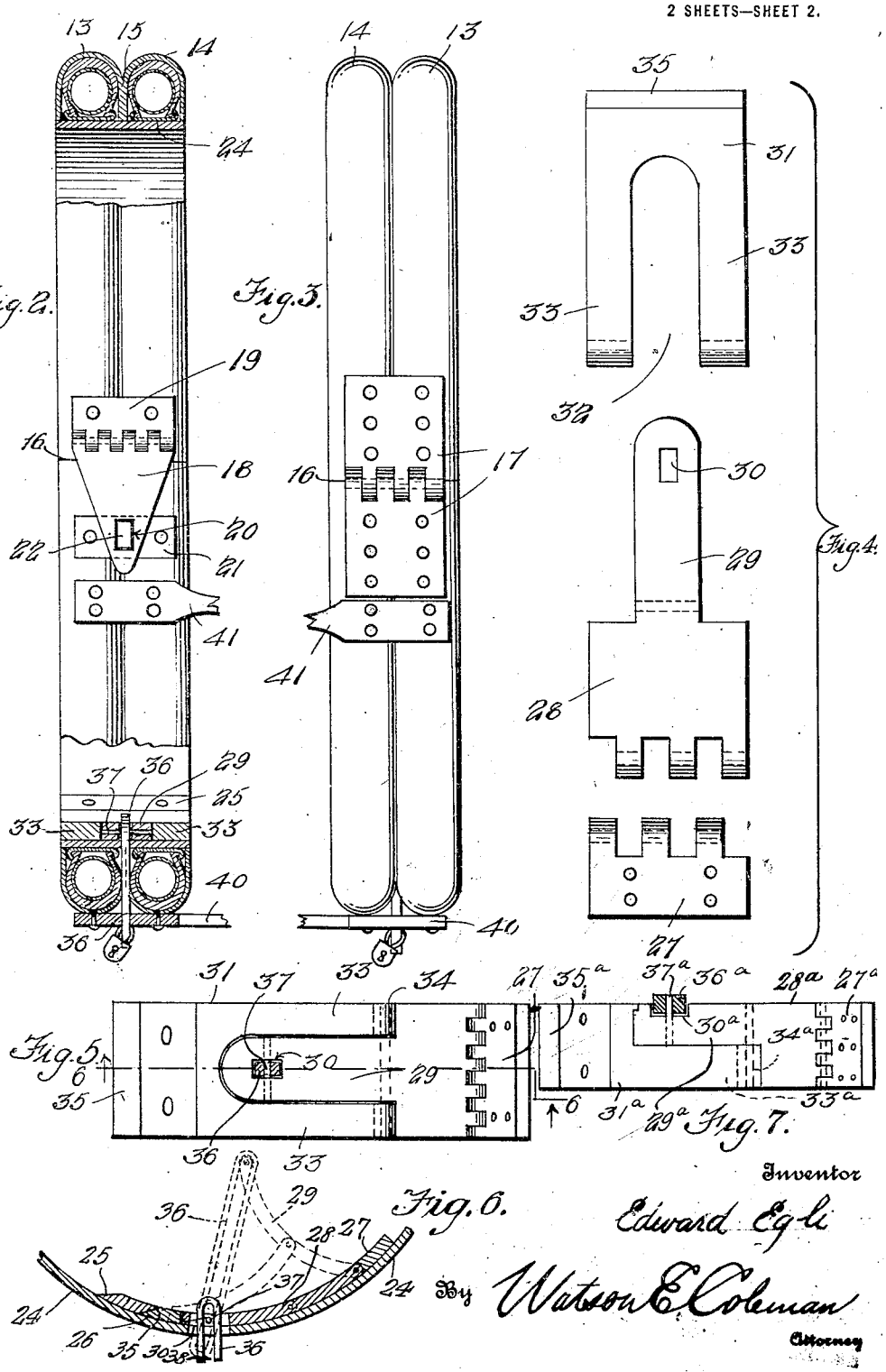

EDWARD EGLI, OF RILEY, OREGON.

TIRE AND WHEEL CARRIER FOR AUTOMOBILES.

1,251,200.  Specification of Letters Patent.  Patented Dec. 25, 1917.

Application filed January 17, 1917. Serial No. 142,898.

*To all whom it may concern:*

Be it known that I, EDWARD EGLI, a citizen of the United States, residing at Riley, in the county of Harney and State of Oregon, have invented certain new and useful Improvements in Tire and Wheel Carriers for Automobiles, of which the following is a specification, reference being had to the accompanying drawings.

This invention relates to automobile accessories and particularly to spare tire carriers or carriers for holding ordinary demountable rims or wheels.

The general object of my invention is to provide a tire carrier of simple construction and convenient form so constructed that it will hold or contain one or two tires or one or two demountable rims with tires thereon or wire wheels with tires.

A further object is to provide a carrier from which the rim with the tires or the wheels with the tires can be lifted vertically.

A further object of the invention is to provide a tire carrier having an annular body, within which a tire having a demountable rim attached thereto may be entirely inclosed, and to provide in connection with the annular body of the tire carrier, an inner annular cover or closure which, when in place, extends across the inner face of the tire disposed in said body, said annular cover being provided with means whereby it may be expanded against the annular body or contracted to permit the removal of the cover from the annular body and thus permit the removal of the tire.

Still another object is to provide a tire carrier having a body formed in two sections hinged to each other so that the body may be opened up and provide locking means for the hinged sections.

Other objects will appear in the course of the following description.

My invention is illustrated in the accompanying drawings, wherein—

Figure 1 is a side elevation partly in section of my wheel carrier;

Fig. 2 is an end elevation partly in section of the same;

Fig. 3 is an end elevation looking toward the hinges 17;

Fig. 4 is a plan view of the expander showing the several parts thereof separated;

Fig. 5 is a plan view of the expander showing the several parts assembled, the locking bar 36 being in section.

Fig. 6 is a longitudinal sectional view of the expanding mechanism on the line 6—6 of Fig. 5, a portion of the covering plate 24 being shown in section;

Fig. 7 is a plan view of a slightly modified form of expanding device.

Referring to Fig. 1 it will be seen that in the form of carrier there illustrated I provide two approximately semi-circular body sections designated generally 10 and 11. These body sections transversely are so formed as to provide two compartments 13 and 14 designed to conform more or less to the transverse contour of a tire, these compartments being separated from each other by a relatively slight intermediate partition 15 as it may be termed, and each of these compartments being transversely concave. These sections 10 and 11 may be made of any suitable material such as sheet metal. The inner faces of the body sections are open. The section 10 is hinged to the section 11 at the joint 16 by means of the hinged leaves 17 of any suitable or convenient form and the free end of the section 10 is engaged with the free end of the section 11 by means of a hasp 18 which is hingedly connected to a base 19, riveted or otherwise attached to the outer face of the body section 10, the hasp being slightly curved and formed at its extremity with a staple opening 20. Attached to the section 11 is a base 21 having a projecting lug or staple 22, perforated as at 23 for the passage of a padlock or other suitable locking device. It will thus be seen that when the hasp 18 is disengaged from its staple, the body section 10 may be lifted up upon its hinge.

While the body sections 10 and 11 as described would partially inclose a tire or a demountable rim with a tire, yet they would not fully inclose and cover in the tire or a tire and demountable rim and would not thoroughly protect the tire and rim and for this reason I provide an inner annular closure member or inner cover designated 24. This may be made of a single sheet or strip of metal which is expanded against the inner edges of the lateral walls of the body sections 10 and 11 and prevented in this expanded position from removal, this inner cover, however, being capable of being contracted and removed from its engagement with the body sections 10 and 11. To this end the ends of this inner cover are connected to each other by a detachable expander and lock. For instance, one end of the strip 24 has attached to it by rivets or like means a lug 25, one end of which is formed with the under-cut face 26. Attached to the other end of the strip 24 is a base piece 27 to which is hinged a leaf 28 having a tongue 29 formed with a perforation 30. Coacting with the leaf 28 is another leaf section 31 which is cut out as at 32 to fit the tongue 29 so as to provide lugs 33 on each side of the tongue, these lugs being hinged as at 34 to the edge of the leaf section 28. The outer end of this leaf section 31 is downwardly and forwardly beveled as at 35 so as to fit beneath the under cut end 26 of the lug 25. A thin shank or locking staple 36 is adapted to extend upward through a slot formed in the partition 15 and through the opening 30 in the tongue 29. A small pivot pin 37 crosses this opening 30 and passes through a slot 38 formed in the locking bar or staple 36. The lower end of this locking bar 36 is provided with a perforation 39 for the reception of a padlock or other locking means. As illustrated in Fig. 2, the outer face of the body portion 11 has riveted to it a plate 40 through which the locking bar 36 passes and when the padlock or other lock is in place in the perforation 39 this locking bar cannot be lifted and, as a consequence, the expander is held in position to expand the inner cover or closure 24 against the inner face of the annular carrier. This plate 40 may be a bracket or one of the brackets supporting the carrier upon the car and as a further means for supporting the carrier upon the car the section 11 adjacent its opposite ends may be provided with the brackets 41 which extend from and are attached to the car in any suitable manner.

In practical use the interior cover 24 is contracted and shifted out of engagement with the sections 10 and 11 and the section 10 is raised upward. Under these circumstances a rim with a tire thereon may be easily inserted in the section 11, then the section 10 is moved over into the position illustrated in Fig. 1 and locked by means of the hasp and staple 18 and 22, then the internal cover 24 is slipped into place with the expander in the position shown in dotted lines in Fig. 6. When now the members 29 and 31 are drawn downward into the same plane, the members 28 and 31 will be forced in opposite directions, thus expanding the internal cover 24 and then the locking bar is locked in place so it cannot be lifted. Thus the tire or rim and tire will be entirely inclosed and protected from dust, dirt and thieves.

The principle of my invention may also be applied obviously to a carrier supporting only one spare tire and in this case a narrow inside cover may be used, such as illustrated in Fig. 7.

The band or cover is of course half the width of the cover 24 and the expanding device is half of the width of the expanding device shown in Fig. 5, as illustrated in Fig. 7, 27ª indicating the base plate, 28ª the hinge leaf, 29ª indicating the tongue, 31ª indicating the leaf section which is pivoted to the tongue by the pivot 34ª, and 35ª indicating the beveled outer end of the leaf section. The locking rod 36ª passes up through a notch 30ª and is pivoted to the tongue 29ª by the pin 37ª.

It is to be understood of course that the cover 24, or the half sized cover is provided with a suitable opening to permit the projection of a valve stem on the tire.

Where the carrier is used with the ordinary demountable rims, an ordinary small Yale lock will be used at the lower end of the locking bar 36, making the device absolutely theft proof, even if the upper carrier section 10 be raised. Where the device is used with wire wheels and the internal cover 24 is not used, then a lock can be used in the staple 22 which will also obviously prevent the removal of the wire wheel from the carrier.

While I have illustrated a construction which I believe to be particularly effective for the purpose intended, it will be obvious that many changes might be made in the details of construction without departing from the spirit of the invention.

What I claim is:

1. A tire carrier for automobiles comprising upper and lower body sections, semicircular in form and transversely concaved, the body sections being hinged to each other at one end, means being provided for detachably locking the sections together, an annular contractible and expansible internal cover designed to extend around within the tire carried in the body sections, and means for expanding the cover against the edges of the body sections and the inside face of the tire including members hinged to each other, one of said members being hinged to one end of the cover and the other member having operative engagement with the opposite end of the cover, said members being adapted to break inward at their point of hinged engagement with each other, and a locking member arranged to prevent the breaking inward of said hinged members.

2. A tire carrier for automobiles comprising upper and lower body sections semi-circular in form and transversely concave, the body sections being hinged to each other at one end, means being provided at the other end of the body sections for detachably locking them together, an annular contractible and expansible internal cover designed to extend around within the tire carrier in the body sections, and means for expanding the cover against the edges of the body sections and locking the cover in place.

3. A tire carrier for automobiles comprising upper and lower body sections semi-circular in form and transversely concave, the body sections being hinged to each other at one end, means being provided at the other end of the body sections for detachably locking them together, an annular contractible and expansible internal cover designed to extend around within the tire carrier in the body sections, and means for expanding the cover against the edges of the body sections and locking the cover in place, said means including members hinged to each other, one of said members being hinged to one end of the cover and the other member having detachable interlocking engagement with the opposite end of the cover.

4. A tire carrier for automobiles comprising upper and lower body sections semi-circular in form and transversely concave, the body sections being hinged to each other at one end, means being provided at the other end of the body sections for detachably locking them together, an annular contractible and expansible internal cover designed to extend around within the tire carrier in the body sections, means for expanding the cover against the edges of the body sections and locking the cover in place, said means comprising a lug having an under-cut face attached at one end of the cover to the inner face thereof, a base member attached to the inner face of the other end of the cover, a hinge leaf hinged to said base and having a tongue, a leaf having an opening for receiving the tongue, said opening defining two legs which are hinged to the first named leaf at the base of the tongue, the extremity of the second named leaf being formed with a beveled face adapted to engage beneath the under-cut lug and the tongue being slotted, a locking bar having a slot, the locking bar passing through the tongue and the tongue having a pin extending through the slot of the locking bar, and means for locking the locking bar from inward movement.

In testimony whereof I hereunto affix my signature in the presence of two witnesses.

EDWARD EGLI.

Witnesses:
WM. FARRE,
Mrs. ANTON EGLI.